US012609089B2

(12) United States Patent
Tsai

(10) Patent No.: US 12,609,089 B2
(45) Date of Patent: Apr. 21, 2026

(54) GLOBAL DIMMING DISPLAY DEVICE AND ITS CONTROL CIRCUIT AND OPERATION METHOD

(71) Applicant: Novatek Microelectronics Corp., Hsinchu (TW)

(72) Inventor: Wei-Chen Tsai, Hsinchu City (TW)

(73) Assignee: Novatek Microelectronics Corp., Hsinchu (TW)

( * ) Notice: Subject to any disclaimer, the term of this patent is extended or adjusted under 35 U.S.C. 154(b) by 3 days.

(21) Appl. No.: 18/751,319

(22) Filed: Jun. 23, 2024

(65) Prior Publication Data

US 2025/0391382 A1 Dec. 25, 2025

(51) Int. Cl.
*G09G 3/34* (2006.01)
*G09G 3/20* (2006.01)

(52) U.S. Cl.
CPC ......... *G09G 3/3406* (2013.01); *G09G 3/2007* (2013.01); *G09G 2320/0626* (2013.01); *G09G 2320/066* (2013.01); *G09G 2340/00* (2013.01); *G09G 2360/18* (2013.01)

(58) Field of Classification Search
CPC ............... G09G 3/3406; G09G 3/2007; G09G 2320/0626; G09G 2320/066; G09G 2340/00; G09G 2360/18
See application file for complete search history.

(56) References Cited

U.S. PATENT DOCUMENTS 9,601,062 B2 * 3/2017 An ...................... G09G 3/3413
11,929,041 B1 * 3/2024 Huang ................. G09G 3/3413
12,057,079 B2 8/2024 Hsiao et al.
12,243,472 B2 3/2025 Ma et al.
2011/0122171 A1 * 5/2011 Kwon .................... G09G 3/342
345/102

(Continued)

FOREIGN PATENT DOCUMENTS

KR 20140093467 A * 7/2014 ........... G09G 3/3688
TW 202331686 8/2023

(Continued)

OTHER PUBLICATIONS

"Office Action of Taiwan Counterpart Application", issued on Feb. 27, 2025, p. 1-p. 6.

*Primary Examiner* — Kenneth Bukowski
(74) *Attorney, Agent, or Firm* — JCIPRNET

(57) ABSTRACT

A global dimming display device and its control circuit and an operation method are provided. The global dimming display device includes a display panel module, a backlight panel module, and a control circuit. The backlight panel module provides backlight to the display panel module. The control circuit checks an image frame. In response to the image frame not being a dark picture, the control circuit performs global dimming on the backlight panel module to set backlight brightness of backlight to normal backlight brightness. In response to the image frame being a dark picture, the control circuit performs global dimming on the backlight panel module to dim the backlight brightness from the normal backlight brightness to dark picture backlight brightness, and gains the image frame of the display panel module to enhance a pixel gray level of the image frame.

42 Claims, 4 Drawing Sheets

(56) References Cited

U.S. PATENT DOCUMENTS

| | | | | |
|---|---|---|---|---|
| 2011/0128302 | A1* | 6/2011 | Cho | G09G 3/3406 345/690 |
| 2012/0120089 | A1* | 5/2012 | Byun | G09G 3/3406 345/589 |
| 2016/0119995 | A1* | 4/2016 | Han | H03K 5/1532 315/193 |
| 2017/0061901 | A1* | 3/2017 | Zhang | G09G 3/3426 |
| 2020/0400984 | A1* | 12/2020 | Liang | G02F 1/13306 |
| 2021/0304687 | A1 | 9/2021 | Shimoshikiryoh et al. | |
| 2023/0237969 | A1* | 7/2023 | Hsiao | G09G 3/3413 345/55 |
| 2024/0046856 | A1 | 2/2024 | Ma et al. | |

FOREIGN PATENT DOCUMENTS

| | | | |
|---|---|---|---|
| TW | 202407679 | 2/2024 | |
| WO | WO-2020103887 A1 * | 5/2020 | G09G 3/36 |

* cited by examiner

GLOBAL DIMMING DISPLAY DEVICE AND ITS CONTROL CIRCUIT AND OPERATION METHOD

BACKGROUND

Technical Field

The disclosure related to display equipment, and in particular, relates to a global dimming display device and its control circuit and an operation method.

Description of Related Art

When the display panel displays a dark scene or a black picture, since the pixels of the display panel inevitably leak light, the picture contrast is poor. How to reduce the amount of light leakage from black pixels and dark pixels in display panel modules is one of many technical issues in the field of display equipment.

SUMMARY

The disclosure provides a global dimming display device and its control circuit and an operation method to improve contrast of a dark picture.

In an embodiment of the disclosure, the global dimming display device includes a display panel module, a backlight panel module, and a control circuit. The backlight panel module is configured to provide backlight to the display panel module. The control circuit is coupled to the display panel module and the backlight panel module. The control circuit checks an image frame. In response to the image frame not being a dark picture, the control circuit performs global dimming on the backlight panel module to set backlight brightness of backlight to normal backlight brightness. In response to the image frame being a dark picture, the control circuit performs global dimming on the backlight panel module to dim the backlight brightness from the normal backlight brightness to dark picture backlight brightness that is darker than the normal backlight brightness, and the controller gains the image frame of the display panel module to enhance a pixel gray level of the image frame.

In an embodiment of the disclosure, the control circuit includes a controller and an image buffer. The image buffer is coupled to the controller to provide the image frame. The controller is coupled to the display panel module and the backlight panel module. The controller checks the image frame. In response to the image frame not being a dark picture, the controller performs global dimming on the backlight panel module to set backlight brightness of the backlight panel module to normal backlight brightness. In response to the image frame being a dark picture, the controller performs global dimming on the backlight panel module to dim the backlight brightness from the normal backlight brightness to dark picture backlight brightness that is darker than the normal backlight brightness, and the controller gains the image frame of the display panel module to enhance a pixel gray level of the image frame.

In an embodiment of the disclosure, the operation method includes the following steps. An image frame is checked. In response to the image frame not being a dark picture, global dimming is performed on a backlight panel module to set backlight brightness of the backlight panel module to normal backlight brightness. In response to the image frame being a dark picture, global dimming is performed on the backlight panel module to dim the backlight brightness from the normal backlight brightness to dark picture backlight brightness that is darker than the normal backlight brightness, and the image frame of a display panel module is gained to enhance a pixel gray level of the image frame.

To sum up, in the embodiments of the disclosure, the control circuit checks the image frame of the display panel module. When the image frame is a dark picture, the control circuit performs global dimming on the backlight panel to dim the backlight brightness from the normal backlight brightness to the dark picture backlight brightness that is darker than the normal backlight brightness, so the amount of light leakage from the black pixels of the display panel is reduced. In addition, because the backlight brightness is dimmed, the power consumption of the backlight panel module is reduced. When the backlight brightness of the backlight panel module is dimmed to the dark picture backlight brightness, the control circuit gains the multiple pixel data of the image frame (increases the pixel gray level of the image frame), so that the visual brightness of the image frame under the dark picture backlight brightness is close to the visual brightness of the image frame under the normal backlight brightness. Therefore, the control circuit is able to improve the contrast of dark pictures in the global dimming mode.

To make the aforementioned more comprehensible, several embodiments accompanied with drawings are described in detail as follows.

DESCRIPTION OF THE EMBODIMENTS

Figure 1:
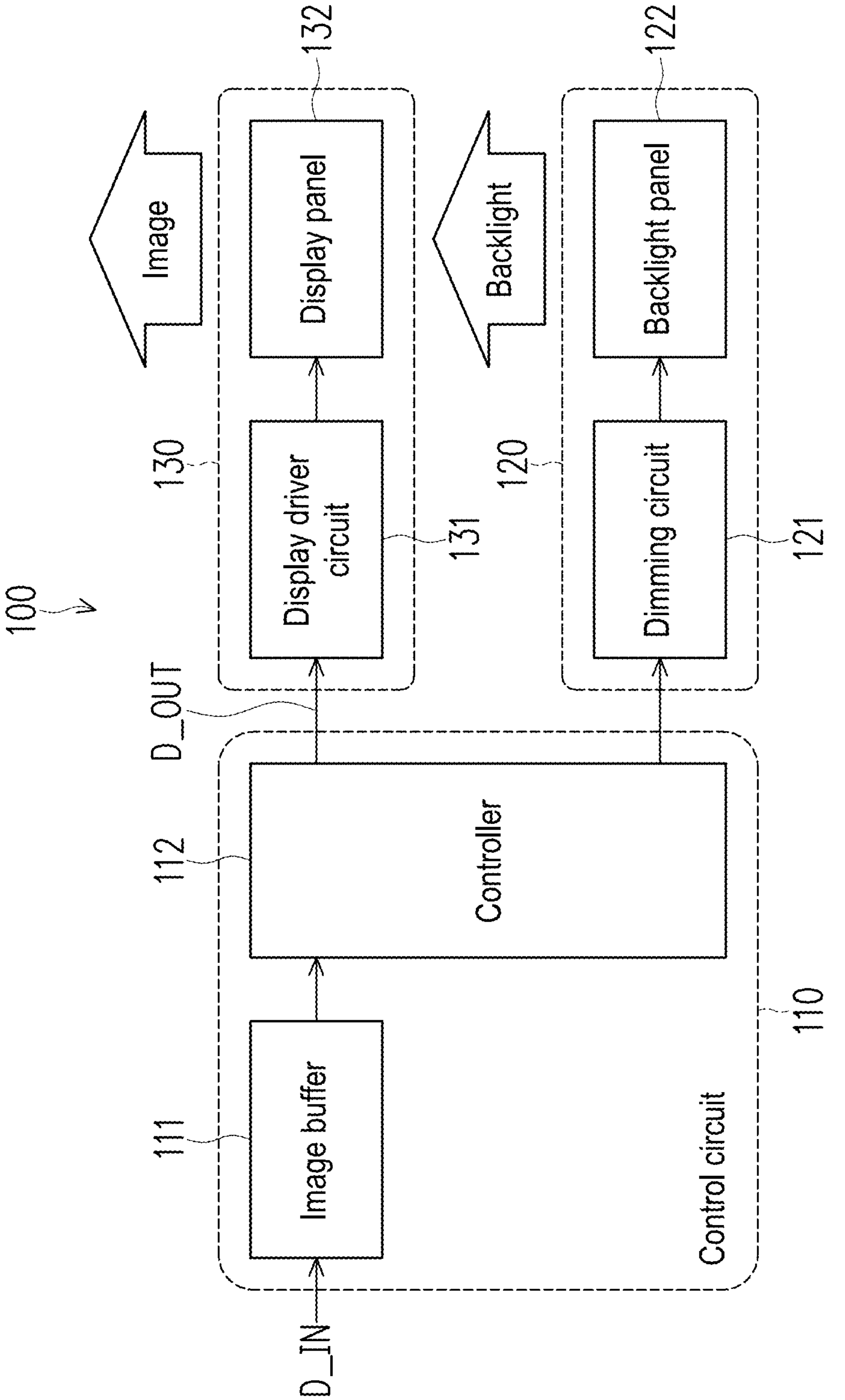
FIG. 1 is a circuit block schematic diagram of a global dimming display device according to an embodiment of the disclosure.

The term "coupled to (or connected to)" used in the entire specification (including claims) refers to any direct or indirect connecting means. For instance, if the disclosure describes a first apparatus is coupled to (or connected to) a second apparatus, the description should be explained as the first apparatus is connected directly to the second apparatus, or the first apparatus, through connecting other apparatus or using certain connecting means, is connected indirectly to the second apparatus. In addition, terms such as "first" and "second" in the entire specification (including claims) are used only to name the elements or to distinguish different embodiments or scopes and should not be construed as the upper limit or lower limit of the number of elements and should not be construed to limit the order of the elements. Moreover, elements/components/steps with the same reference numerals represent the same or similar parts in the figures and embodiments where appropriate. Elements/components/steps having same reference numerals or same terms are used as cross reference in different embodiments.

FIG. 1 is a circuit block schematic diagram of a global dimming display device 100 according to an embodiment of the disclosure. The global dimming display device 100 includes a control circuit 110, a backlight panel module 120, and a display panel module 130. The control circuit 110 is coupled to the display panel module 130 and the backlight panel module 120. The control circuit 110 checks an image frame D_IN. The control circuit 110 may control the backlight panel module 120 to provide backlight to the display panel module 130. For instance, in response to the image frame D_IN not being a dark picture (dark scene), the control circuit 110 may perform global dimming on the backlight panel module 120 based on a current user setting parameter to set backlight brightness of the backlight panel module 120 to normal backlight brightness. Generally, a dark scene (dark picture) refers to a scene in which overall average brightness of the picture is low. For instance, an image frame whose average pixel gray level (APL) is less than a threshold can be defined as a dark picture (dark scene). The threshold can be determined according to actual design. For instance, in some embodiments, the threshold may be an intermediate gray level (e.g., 512) in a gray level value range (e.g., 0 to 1023).

In the embodiment shown in FIG. 1, the backlight panel module 120 includes a dimming circuit 121 and a backlight panel 122. Based on the actual design, the backlight panel 122 includes a global dimming backlight panel or other types of backlight panels. The dimming circuit 121 is coupled to the backlight panel 122 and the control circuit 110. Based on control of the control circuit 110, the dimming circuit 121 performs global dimming on the backlight panel 122. For instance, the control circuit 110 may control the dimming circuit 121 based on the current user setting parameter to set the backlight brightness of the backlight panel 122 to the normal backlight brightness. In this embodiment, the implementation details of the dimming circuit 121 and the backlight panel 122 are not limited. For instance, the dimming circuit 121 can be a conventional dimming circuit or other dimming circuits, and the backlight panel 122 can be a conventional backlight panel or other backlight panels.

The control circuit 110 may use the image frame D_IN to perform image processing to generate an image frame D_OUT for the display panel module 130. In the embodiment shown in FIG. 1, the display panel module 130 includes a display driver circuit 131 and a display panel 132. Based on actual design, the display panel 132 includes a liquid-crystal display (LCD) panel or other types of display panels. The display driver circuit 131 is coupled to the display panel 132 and the control circuit 110. The control circuit 110 may generate the image frame D_OUT to the display driver circuit 131. Based on the control of the control circuit 110, the display driver circuit 131 may drive the display panel 132 to display an image. In this embodiment, the implementation details of the display driver circuit 131 and the display panel 132 are not limited. For instance, the display driver circuit 131 may be a conventional display driver or other display driver circuit, and the display panel 132 may be a conventional display panel or other display panel.

When the image displayed on the display panel 132 is a dark scene (or even a black picture), black pixels (the gray levels of all color sub-pixels are 0) of the display panel 132 inevitably leak light, resulting in poor image contrast. Dark pixels (gray levels of all color sub-pixels are close to 0) of the display panel 132 also have a similar light leakage phenomenon. The following embodiments will illustrate how to reduce the amount of light leakage of black pixels (dark pixels) of the display panel module 130 under the global dimming condition, so that user experience can be improved.

Under the global dimming condition, in the following embodiments, through real-time image analysis, the control circuit 110 appropriately reduces the backlight brightness of the backlight panel 122 in a dark scene in a global dimming manner. For instance, in response to the image frame D_IN being a dark picture (dark scene), the control circuit 110 performs global dimming on the backlight panel module 120 to dim the backlight brightness from the normal backlight brightness to dark picture backlight brightness that is darker than the normal backlight brightness. Therefore, dark scenes may be darker (because the amount of light leakage from black pixels and dark pixels of display panel 132 is reduced).

In addition, in response to the image frame D_IN being a dark picture (dark scene), the control circuit 110 may gain the image frame of the display panel module 130 to enhance a pixel gray level of the image frame D_OUT. To be specific, when the image frame D_IN is not a dark picture, the control circuit 110 sets a pixel data gain parameter to a normal gain value. When the image frame is a dark picture, the control circuit 110 increases the pixel data gain parameter from the normal gain value to a dark picture gain value to improve the pixel gray level of the image frame. The control circuit 110 gains the image frame based on the pixel data gain parameter to generate a gained image frame D_OUT. The control circuit 110 controls the display panel module 130 to display an image based on the gained image frame D_OUT.

When reducing the backlight brightness for a dark scene, the control circuit 110 may also correspondingly gain the image frame D_OUT of the display panel module 130, so as to retain image details in the dark scene. Therefore, for the same image frame (dark scene), visual brightness under the dark picture backlight brightness is close to visual brightness under the normal backlight brightness. Based on the above, because the backlight brightness is reduced while the image data is increased to preserve image details, the control circuit 110 may improve image contrast of the dark picture in the global dimming mode, so that an effect similar to local dimming is achieved.

In the embodiment shown in FIG. 1, the control circuit 110 includes an image buffer 111 and a controller 112 The image buffer 111 is coupled to the controller 112. The image buffer 111 temporarily stores and provides the image frame D_IN to the controller 112. The controller 112 is coupled to the display panel module 130 and the backlight panel module 120. The controller 112 checks picture characteristics of the image frame D_IN. The controller 112 controls the backlight panel module 120 and the display panel module 130 according to the picture characteristics of the image frame D_IN. According to different designs, in some embodiments, the control circuit 110 and/or the controller 112 may be implemented as hardware circuit(s). In some other embodiments, the control circuit 110 and/or the controller 112 may be implemented in a combination of hardware, firmware, and software (i.e., a program).

In terms of hardware, the control circuit 110 and/or the controller 112 may be implemented as a logic circuit on an integrated circuit. For instance, the related functions of the control circuit 110 and/or the controller 112 may be implemented in various logic blocks, modules, and circuits in one or a plurality of hardware controllers, microcontrollers, hardware processors, microprocessors, application-specific integrated circuits (ASICs), digital signal processors (DSP), field programmable gate arrays (FPGA), central processing units (CPUs), and/or other processing units. The related functions of the control circuit 110 and/or the controller 112 may be implemented as hardware circuits using hardware description languages (e.g., Verilog HDL or VHDL) or other suitable programming languages, such as various logic blocks, modules, and circuits in integrated circuits.

In terms of software and/or firmware, the related functions of the control circuit 110 and/or the controller 112 may be implemented as programming codes. For instance, the control circuit 110 and/or the controller 112 may be implemented by using a general programming language (e.g., C, C++, or an assembly language) or other suitable programming languages. The programming codes may be recorded/stored in a "non-transitory machine-readable storage medium". In some embodiments, the non-transitory machine-readable storage medium includes, for example, a semiconductor memory and/or a storage device. The storage device includes a hard disk drive (HDD) a solid-state drive (SSD), or other storage devices. The electronic device (e.g., CPU, hardware controller, microcontroller, hardware processor, or microprocessor) can read and execute the programming codes from the non-transitory machine-readable storage medium, so that the related functions of the control circuit 110 and/or the controller 112 are implemented.

Figure 2:
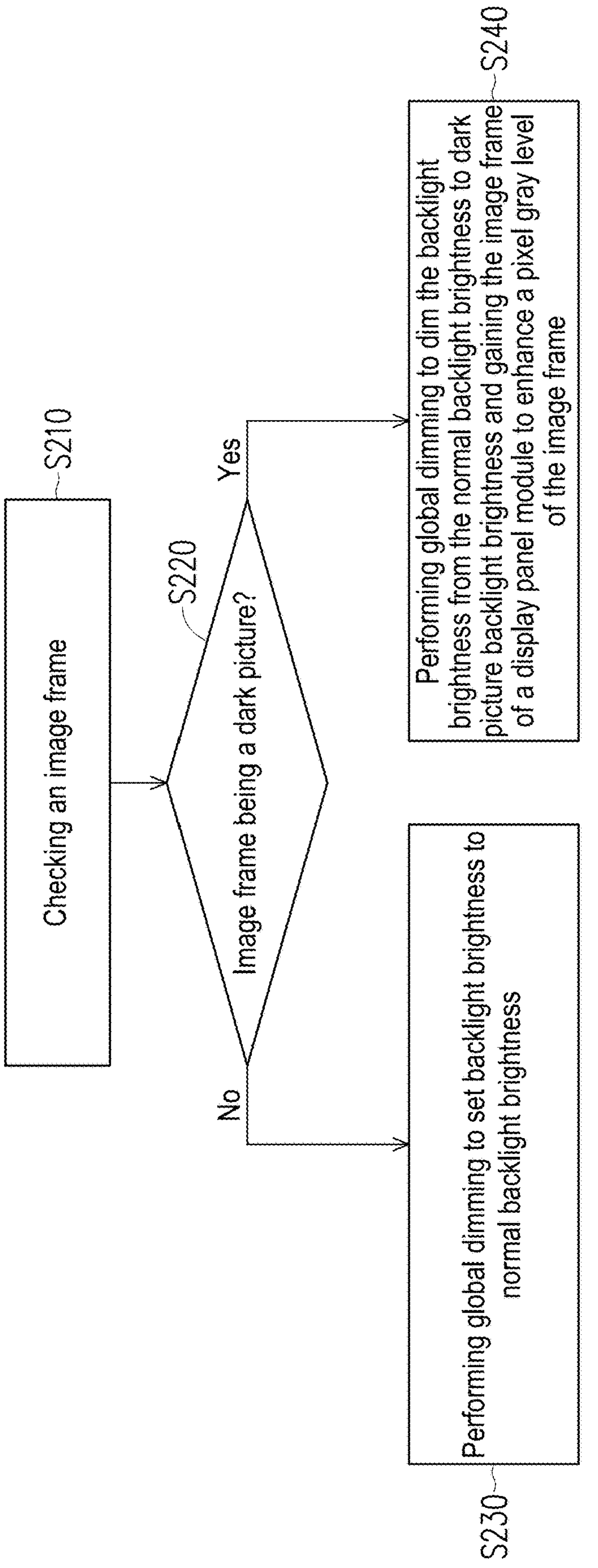
FIG. 2 is a schematic flow chart of an operation method of a control circuit according to an embodiment of the disclosure.

FIG. 2 is a schematic flow chart of an operation method of a control circuit according to an embodiment of the disclosure. With reference to FIG. 1 and FIG. 2, in step S210, the controller 112 checks the picture characteristics of the image frame D_IN. In response to the image frame D_IN not being a dark picture (the determination result of step S220 is "No"), the controller 112 proceeds to step S230. In step S230, the controller 112 controls the dimming circuit 121 of the backlight panel module 120 to perform global dimming on the backlight panel 122 to set the backlight brightness of the backlight panel 122 to the normal backlight brightness. In response to the image frame D_IN being a dark picture (the determination result of step S220 is "Yes"), the controller 112 proceeds to step S240. In step S240, the controller 112 controls the dimming circuit 121 to perform global dimming to dim the backlight brightness of the backlight panel 122 from the normal backlight brightness to the dark picture backlight brightness (the dark picture backlight brightness is smaller than the normal backlight brightness).

For instance, the controller 112 checks a gray level feature of the image frame D_IN. The controller 112 converts the gray level feature of the image frame D_IN into a dimming parameter based on a gray level to backlight conversion curve. The controller 112 performs global dimming on the backlight panel module 120 based on the dimming parameter. The specific implementation of the gray level feature and the gray level to backlight conversion curve may be determined according to the actual design. For instance, the gray level feature includes at least one of an average pixel gray level (APL) and a gray level histogram of the image frame D_IN. In some embodiments, the gray level to backlight conversion curve may be implemented as a lookup table. In some other embodiments, the gray level to backlight conversion curve may be implemented as the conversion curve shown in FIG. 3 or other conversion curves.

Figure 3:
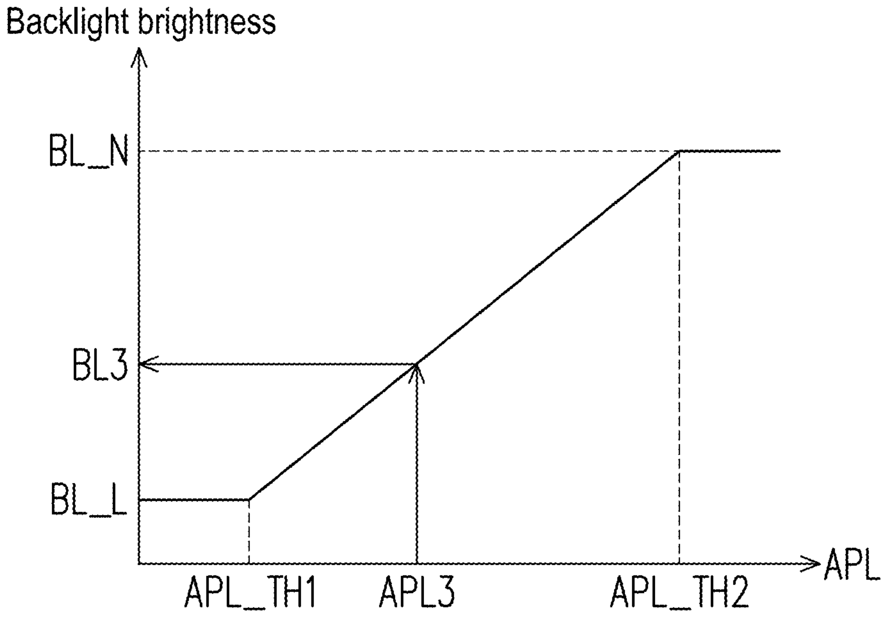
FIG. 3 is a schematic graph illustrating a gray level to backlight conversion curve according to an embodiment of the disclosure.

FIG. 3 is a schematic graph illustrating a gray level to backlight conversion curve according to an embodiment of the disclosure. The horizontal axis of FIG. 3 represents the average pixel gray level (APL), and the vertical axis of FIG. 3 represents the backlight brightness. With reference to FIG. 1 and FIG. 3, when a current average pixel gray level APL3 of the image frame D_IN is greater than a threshold APL_TH2, the controller 112 determines that the image frame D_IN is not a dark picture. The threshold APL_TH2 may be defined according to the actual design. For instance, in some embodiments, the threshold APL_TH2 may be an intermediate gray level (e.g., 512) in a gray level value range (e.g., 0 to 1023). In some other embodiments, the threshold APL_TH2 may be any real number, such as 500 or other values. When the image frame D_IN is not a dark picture (the average pixel gray level APL3 is greater than the threshold APL_TH2), the controller 112 sets the backlight brightness of the backlight panel 122 to the normal backlight brightness (normal brightness value) BL_N.

When the current average pixel gray level APL3 of the image frame D_IN is less than the threshold APL_TH2, the controller 112 determines that the image frame D_IN is a dark picture. When the average pixel gray level APL3 is less than the threshold APL_TH2 and greater than a threshold APL_TH1, the controller 112 uses the gray level to backlight conversion curve shown in FIG. 3 to convert the average pixel gray level APL3 of the image frame D_IN into the backlight brightness BL3 (dark picture brightness value) as the dimming parameter of the dimming circuit 121. When the average pixel gray level APL3 is less than the threshold APL_TH1, the controller 112 sets the backlight brightness of the backlight panel 122 to minimum backlight brightness BL_L. The threshold APL_TH1 and the minimum backlight brightness BL_L may be any real number determined according to the actual design. For instance, it is assumed that the threshold APL_TH2 is 500, the threshold APL_TH1 is 100, the normal backlight brightness BL_N is 1000, and the minimum backlight brightness BL_L is 200. When the average pixel gray level APL3 of the image frame D_IN is 200, the controller 112 uses the gray level to backlight conversion curve shown in FIG. 3 to learn that the backlight brightness BL3 is 400.

The backlight brightness setting of the backlight panel 122 is not limited to the aforementioned method. For instance, in some other embodiments, the controller 112 may further adjust the backlight brightness BL3 to generate the dimming parameter of the dimming circuit 121. Specific description is provided as follows.

The controller 112 checks the average pixel gray level and the gray level histogram of the image frame D_IN. The controller 112 converts the average pixel gray level of the image frame D_IN into a preliminary parameter based on the gray level to backlight conversion curve (for example, using the conversion curve shown in FIG. 3 to convert the average pixel gray level APL3 into the backlight brightness BL3 as a preliminary parameter). The controller 112 determines a protection upper limit based on the gray level histogram of the image frame D_IN. The controller 112 may find a maximum gray level interval in which the number of pixels is not 0 from a plurality of gray level intervals of the gray level histogram and then find the protection upper limit corresponding to the maximum gray level interval in which the number of pixels is not 0 from the lookup table (e.g., the following Lookup Table 1).

Lookup Table 1

| | Gray level interval | | | | | | |
|---|---|---|---|---|---|---|---|
| | 0 | 1 | 2 | 3 | 4 | 5 | . . . |
| Protection upper limit | PL0 | PL1 | PL2 | PL3 | PL4 | PL5 | . . . |

The gray level intervals 0 to 5 in the Lookup Table 1 may be defined according to the actual design. For instance (but not limited to), the gray level interval 0 may represent pixel gray levels 0 to 15, the gray level interval 1 may represent pixel gray levels 16 to 31, the gray level interval 2 may represent pixel gray levels 32 to 47, the gray level interval 3 may represent pixel gray levels 48 to 63, the gray level interval 4 may represent pixel gray levels 64 to 79, and the rest may be deduced by analogy. The protection upper limits PL0 to PL5 in the Lookup Table 1 may be defined according to the actual design. For instance (but not limited to), the protection upper limit PL0 may represent 200, the protection upper limit PL1 may represent 200, the protection upper limit PL2 may represent 200, the protection upper limit PL3 may represent 300, and the protection upper limit PL4 may represent 350.

The controller 112 generates a dimming parameter based on the protection upper limit and the preliminary parameter. For instance, the controller 112 compares the protection upper limit to the preliminary parameter. In response to the preliminary parameter being greater than the protection upper limit, the controller 112 treats the protection upper limit as the dimming parameter. In response to the preliminary parameter not being greater than the protection upper limit, the controller 112 treats the preliminary parameter as the dimming parameter. The controller 112 performs global dimming on the backlight panel module 120 based on the dimming parameter. For instance, it is assumed that the threshold APL_TH2 is 500, the threshold APL_TH1 is 100, the normal backlight brightness BL_N is 1000, and the minimum backlight brightness BL_L is 200 as shown in FIG. 3. When the average pixel gray level APL3 of the image frame D_IN is 200, the controller 112 uses the gray level to backlight conversion curve shown in FIG. 3 to learn that the preliminary parameter (backlight brightness BL3) is 400. Assuming that among the plurality of gray level intervals of the gray level histogram, "the maximum gray level interval in which the number of pixels is not 0" is "gray level interval 4", the controller 112 finds out from the Lookup Table 1 that the protection upper limit is PL4 (e.g., 350). Because the preliminary parameter "400" is greater than the protection upper limit "350", the controller 112 treats the protection upper limit "350" as the dimming parameter instead of treating the preliminary parameter "400" as the dimming parameter.

In step S240 as shown in FIG. 2, the controller 112 also gains (amplifies) the image frame D_IN to generate the gained image frame D_OUT to the display panel module 130 to enhance the pixel gray level of the image frame D_OUT. For instance, the controller 112 checks the gray level feature of the image frame D_IN. The controller 112 converts the gray level feature of the image frame D_IN into the pixel data gain parameter based on the gray level to gain conversion curve. The controller 112 gains the image frame D_IN based on the pixel data gain parameter to generate the image frame D_OUT, so as to selectively enhance the pixel gray level of the image frame D_OUT. The specific implementation of the gray level feature and the gray level to gain conversion curve may be determined according to the actual design. For instance, the gray level feature includes at least one of the average pixel gray level (APL) and the gray level histogram of the image frame D_IN. In some embodiments, the gray level to gain conversion curve may be implemented as a lookup table. In some other embodiments, the gray level to gain conversion curve may be implemented as the conversion curve shown in FIG. 4 or other conversion curves.

Figure 4:
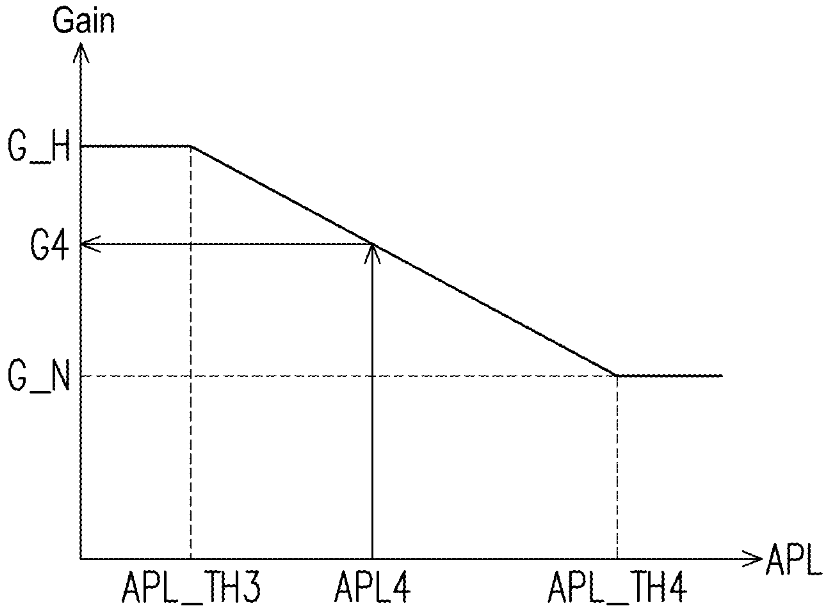
FIG. 4 is a schematic graph illustrating a gray level to gain conversion curve according to an embodiment of the disclosure.

FIG. 4 is a schematic graph illustrating a gray level to gain conversion curve according to an embodiment of the disclosure. The horizontal axis of FIG. 4 represents the average pixel gray level (APL), and the vertical axis of FIG. 4 represents gain. With reference to FIG. 1 and FIG. 4, when a current average pixel gray level APL4 of the image frame D_IN is greater than a threshold APL_TH4, the controller 112 determines that the image frame D_IN is not a dark picture. The threshold APL_TH4 may be defined according to the actual design. For instance, in some embodiments, the threshold APL_TH4 may be an intermediate gray level (e.g., 512) in a gray level value range (e.g., 0 to 1023). In some other embodiments, the threshold APL_TH4 may be any real number, such as 500 or other values. When the image frame D_IN is not a dark picture (the average pixel gray level APL4 is greater than the threshold APL_TH4), the controller 112 sets the pixel data gain parameter of the image frame D_OUT to a normal gain value G_N.

When the current average pixel gray level APL4 of the image frame D_IN is less than the threshold APL_TH4, the controller 112 determines that the image frame D_IN is a dark picture. When the average pixel gray level APL4 is less than the threshold APL_TH4 and greater than a threshold APL_TH3, the controller 112 uses the gray level to gain conversion curve shown in FIG. 4 to convert the average pixel gray level APL4 of the image frame D_IN into a gain G4 (dark picture gain value) shown in FIG. 4 as the pixel data gain parameter of the image frame D_OUT. When the average pixel gray level APL4 is less than the threshold APL_TH3, the controller 112 sets the pixel data gain parameter of the image frame D_OUT to a highest gain G_H. The threshold APL_TH3 and the highest gain G_H may be any real number determined according to the actual design. For instance, it is assumed that the threshold APL_TH4 is 500, the threshold APL_TH3 is 100, the normal gain value G_N is 1000, and the highest gain G_H is 2000. When the average pixel gray level APL4 of the image frame D_IN is 200, the controller 112 uses the gray level to gain conversion curve shown in FIG. 4 to learn that the gain G4 is 1750.

The pixel data gain parameter setting of the image frame D_OUT is not limited to the aforementioned method. For instance, in some other embodiments, the controller 112 may further adjust the gain G4 to generate the pixel data gain parameter of the image frame D_OUT. Specific description is provided as follows.

The controller 112 checks the average pixel gray level and the gray level histogram of the image frame D_IN. The controller 112 converts the average pixel gray level of the image frame D_IN into the preliminary parameter based on the gray level to gain conversion curve (for example, using the conversion curve shown in FIG. 4 to convert the average pixel gray level APL4 into the gain G4 as the preliminary gain parameter). The controller 112 determines a gain upper limit based on the gray level histogram of the image frame D_IN. The controller 112 may find the maximum gray level interval in which the number of pixels is not 0 from the plurality of gray level intervals of the gray level histogram and then find the gain upper limit corresponding to the maximum gray level interval in which the number of pixels is not 0 from the lookup table (e.g., the following Lookup Table 2).

| Lookup Table 2 | | | | | | | |
|---|---|---|---|---|---|---|---|
| | Gray level interval | | | | | | |
| | 0 | 1 | 2 | 3 | 4 | 5 | . . . |
| Gain upper limit | ML0 | ML1 | ML2 | ML3 | ML4 | ML5 | . . . |

The gray level intervals 0 to 5 in the Lookup Table 2 may be defined according to the actual design. For instance (but not limited to), the gray level interval 0 may represent pixel gray levels 0 to 15, the gray level interval 1 may represent pixel gray levels 16 to 31, the gray level interval 2 may represent pixel gray levels 32 to 47, the gray level interval 3 may represent pixel gray levels 48 to 63, the gray level interval 4 may represent pixel gray levels 64 to 79, and the rest may be deduced by analogy. The gain upper limits ML0 to ML5 in the Lookup Table 2 may be defined according to the actual design. For instance (but not limited to), the gain upper limit ML0 may be 2000, the gain upper limit ML1 may be 2000, the gain upper limit ML2 may be 1800, the gain upper limit ML3 may be 1600, and the gain upper limit ML4 may be 1300.

The controller 112 generates the pixel data gain parameter of the image frame D_OUT based on the gain upper limit and the preliminary gain parameter. For instance, the controller 112 compares the gain upper limit to the preliminary gain parameter. In response to the preliminary gain parameter being greater than the gain upper limit, the controller 112 treats the gain upper limit as the pixel data gain parameter of the image frame D_OUT. In response to the preliminary gain parameter not being greater than the gain upper limit, the controller 112 treats the preliminary gain parameter as the pixel data gain parameter of the image frame D_OUT. The controller 112 gains the image frame D_OUT based on the pixel data gain parameter to enhance the pixel gray level of the image frame.

For instance, it is assumed that the threshold APL_TH4 is 500, the threshold APL_TH3 is 100, the normal gain value G_N is 1000, and the highest gain G_H is 2000 as shown in FIG. 4. When the average pixel gray level APL4 of the image frame D_IN is 200, the controller 112 uses the gray level to gain conversion curve shown in FIG. 4 to learn that the preliminary gain parameter (gain G4) is 1750. Assuming that among the plurality of gray level intervals of the gray level histogram, "the maximum gray level interval in which the number of pixels is not 0" is "gray level interval 3", the controller 112 finds out from the Lookup Table 2 that the gain upper limit is ML3 (e.g., 1600). Because the preliminary gain parameter "1750" is greater than the gain upper limit "1600", the controller 112 treats the upper gain limit "1600" as the pixel data gain parameter of the image frame D_OUT, instead of treating the preliminary gain parameter "1750" as the pixel data gain parameter of the image frame D_OUT.

Figure 5:
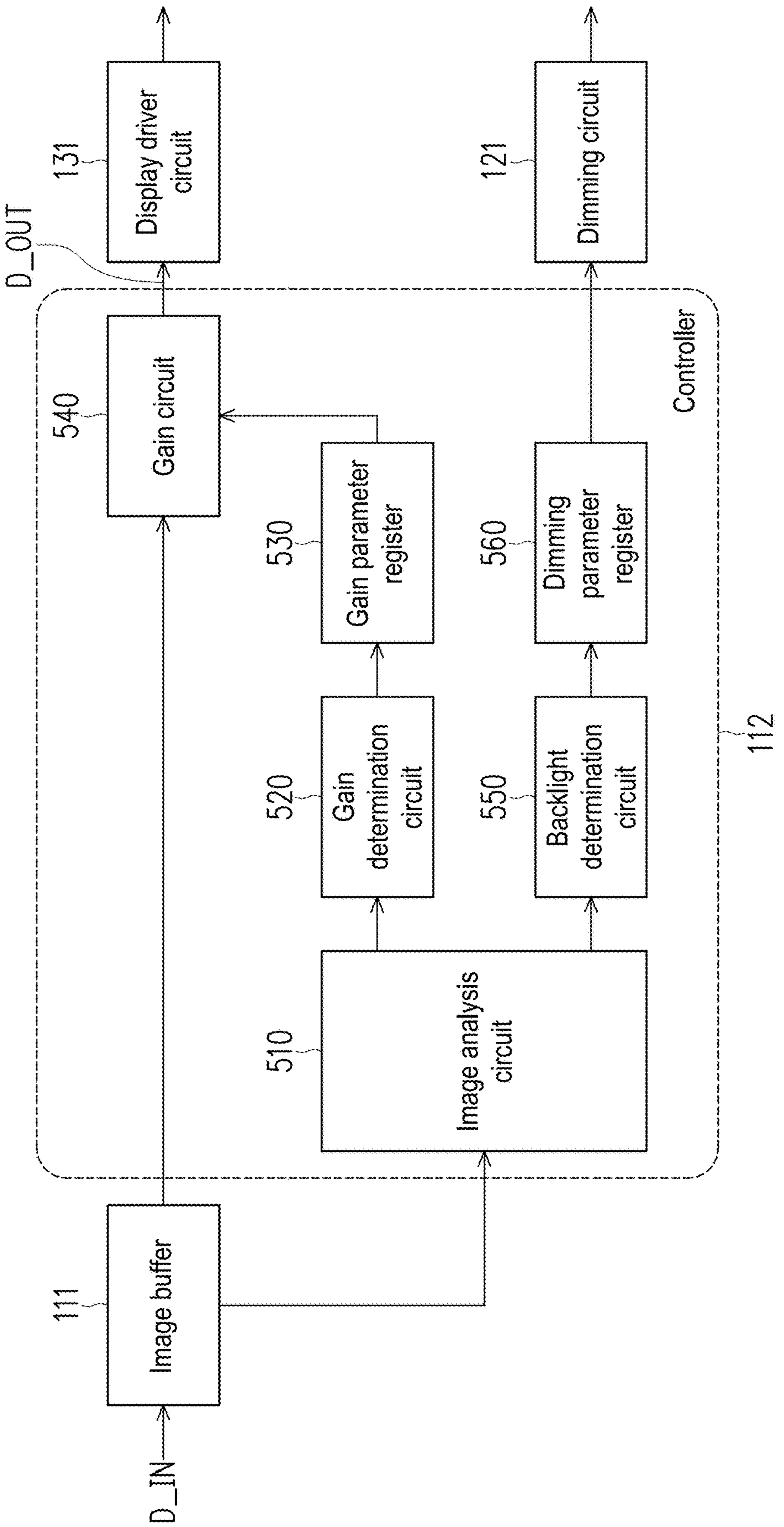
FIG. 5 is a circuit block schematic diagram illustrating a controller according to an embodiment of the disclosure.

FIG. 5 is a circuit block schematic diagram illustrating a controller 112 according to an embodiment of the disclosure. The controller 112 shown in FIG. 5 may be treated as one of many implementation examples of the controller 112 shown in FIG. 1. In the embodiment shown in FIG. 5, the controller 112 includes an image analysis circuit 510, a gain determination circuit 520, a gain parameter register 530, a gain circuit 540, a backlight determination circuit 550, and a dimming parameter register 560. The image analysis circuit 510 analyzes the image frame D_IN provided by the image buffer 111 to calculate the gray level feature of the image frame D_IN. The specific implementation of the gray level feature may be determined according to the actual design. For instance, the gray level feature includes at least one of the average pixel gray level (APL) and the gray level histogram of the image frame D_IN.

The gain determination circuit 520 is coupled to the image analysis circuit 510. In response to the gray level feature indicating that the image frame D_IN is not a dark picture, the gain determination circuit 520 sets the pixel data gain parameter to the normal gain value. In response to the gray level feature indicating that the image frame D_IN is a dark picture, the gain determination circuit 520 increases the pixel data gain parameter from the normal gain value to the dark picture gain value to enhance the pixel gray level of the image frame D_OUT. The description of FIG. 4 and the Lookup Table 2 may be treated as one of many operating examples of the gain determination circuit 520. The gain parameter register 530 is coupled between the gain determination circuit 520 and the gain circuit 540. The gain determination circuit 520 writes the pixel data gain parameter into the gain parameter register 530. The gain circuit 540 obtains the pixel data gain parameter from the gain parameter register 530. The gain circuit 540 is coupled between the image buffer 111 and the display driver circuit 131 of the display panel module 130. The gain circuit 540 gains the image frame D_IN provided by the image buffer 111 based on the pixel data gain parameter of the gain parameter register 530 to generate the gained image frame D_OUT to the display driver circuit 131.

The backlight determination circuit 550 is coupled to the image analysis circuit 510. In response to the gray level feature indicating that the image frame D_IN is not a dark picture, the backlight determination circuit 550 sets the dimming parameter to the normal brightness value. In response to the gray level feature indicating that the image frame D_IN is a dark picture, the backlight determination circuit 550 dims the dimming parameter from the normal brightness value to the dark picture brightness value to reduce black pixel light leakage of the display panel module 130. The description of FIG. 3 and the Lookup Table 1 may be treated as one of many operating examples of the backlight determination circuit 550. The dimming parameter register 560 is coupled between the backlight determination circuit 550 and the dimming circuit 121. The backlight determination circuit 220 writes the dimming parameter into the dimming parameter register 560. The dimming circuit 121 obtains the dimming parameter from the dimming parameter register 560. The dimming circuit 121 performs global dimming on the backlight panel 122 based on the dimming parameter of the dimming parameter register 560.

In view of the foregoing, the control circuit 110 described in the above embodiments may check the image frame D_IN of the display panel module 130. When the image frame D_IN is a dark picture, the control circuit 110 performs global dimming on the backlight panel 122 through the dimming circuit 121 to dim the backlight brightness from the normal backlight brightness to the dark picture backlight brightness that is darker than the normal backlight brightness, so the amount of light leakage from the black pixels of the display panel 132 is reduced. In addition, because the backlight brightness is dimmed, the power consumption of the backlight panel module 130 is reduced. When the backlight brightness of the backlight panel module 130 is dimmed to the dark picture backlight brightness, the control circuit 110 may also gain the multiple pixel data of the image frame D_OUT (increase the pixel gray level of the image frame D_OUT), so that the visual brightness of the image frame D_IN under the dark picture backlight brightness is close to the visual brightness of the image frame D_IN under the normal backlight brightness. Therefore, the control circuit 110 may improve the contrast of dark pictures in the global dimming mode.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A global dimming display device comprising:

a display panel module comprising a display panel;

a backlight panel module comprising a backlight panel, configured to provide backlight to the display panel module; and a control circuit coupled to the display panel module and the backlight panel module, wherein the control circuit is configured to check an image frame, in response to the image frame not being a dark picture, the control circuit performs global dimming on the backlight panel module to set backlight brightness of the backlight to normal backlight brightness, and in response to the image frame being a dark picture, the control circuit performs global dimming on the backlight panel module to dim the backlight brightness from the normal backlight brightness to dark picture backlight brightness that is darker than the normal backlight brightness, and the control circuit gains the entire image frame of the display panel module to enhance a pixel gray level of the image frame.

2. The global dimming display device according to claim 1, wherein in response to the image frame not being a dark picture, the control circuit sets a pixel data gain parameter to a normal gain value, in response to the image frame being a dark picture, the control circuit increases the pixel data gain parameter from the normal gain value to a dark picture gain value to enhance the pixel gray level of the image frame, the control circuit gains the image frame based on the pixel data gain parameter to generate a gained image frame, and the control circuit controls the display panel module to display an image based on the gained image frame.

3. The global dimming display device according to claim 1, wherein the display panel module further comprises:

a display driver circuit coupled to the display panel, wherein the display driver circuit is configured to drive the display panel to display an image based on control of the control circuit.

4. The global dimming display device according to claim 1, wherein the backlight panel module further comprises:

a dimming circuit coupled to the backlight panel, wherein the dimming circuit is configured to perform global dimming on the backlight panel based on control of the control circuit.

5. The global dimming display device according to claim 4, wherein the backlight panel comprises a global dimming backlight panel.

6. The global dimming display device according to claim 1, wherein the control circuit comprises:

a controller circuit coupled to the display panel module and the backlight panel module, wherein the controller circuit is configured to check the image frame; and an image buffer circuit coupled to the controller circuit, wherein the image buffer circuit is configured to provide the image frame to the controller circuit, in response to the image frame not being a dark picture, the controller circuit controls a dimming circuit of the backlight panel module to set the backlight brightness of the backlight panel module to the normal backlight brightness, and in response to the image frame being a dark picture, the controller circuit controls the dimming circuit to dim the backlight brightness of the backlight panel module from the normal backlight brightness to the dark picture backlight brightness, and gains the image frame to generate a gained image frame for the display panel module.

7. The global dimming display device according to claim 6, wherein the controller circuit comprises:

an image analysis circuit configured to analyze the image frame to calculate a gray level feature of the image frame;

a gain determination circuit coupled to the image analysis circuit, wherein in response to the gray level feature indicating that the image frame is not a dark picture, the gain determination circuit sets a pixel data gain parameter to a normal gain value, and in response to the gray level feature indicating that the image frame is a dark picture, the gain determination circuit increases the pixel data gain parameter from the normal gain value to a dark picture gain value to enhance the pixel gray level of the image frame;

a gain circuit coupled to the display panel module, wherein the gain circuit gains the image frame based on the pixel data gain parameter to generate the gained image frame for the display panel module; and a backlight determination circuit coupled to the image analysis circuit, wherein in response to the gray level feature indicating that the image frame is not a dark picture, the backlight determination circuit sets a dimming parameter to a normal brightness value, and in response to the gray level feature indicating that the image frame is a dark picture, the backlight determination circuit reduces the dimming parameter from the normal brightness value to a dark picture brightness value to reduce black pixel light leakage of the display panel module, wherein the dimming circuit performs global dimming on the backlight panel module based on the dimming parameter.

8. The global dimming display device according to claim 7, wherein the gray level feature comprises at least one of an average pixel gray level and a gray level histogram of the image frame.

9. The global dimming display device according to claim 7, wherein the controller circuit further comprises:

a hardware gain parameter register coupled between the gain determination circuit and the gain circuit, wherein the gain determination circuit writes the pixel data gain parameter into the hardware gain parameter register, and the gain circuit obtains the pixel data gain parameter from the hardware gain parameter register; and a hardware dimming parameter register coupled between the backlight determination circuit and the dimming circuit, wherein the backlight determination circuit writes the dimming parameter into the hardware dimming parameter register, and the dimming circuit obtains the dimming parameter from the hardware dimming parameter register.

10. The global dimming display device according to claim 1, wherein the control circuit checks a gray level feature of the image frame, the control circuit converts the gray level feature into a pixel data gain parameter based on a gray level to gain conversion curve, and the control circuit gains the image frame based on the pixel data gain parameter to enhance the pixel gray level of the image frame.

11. The global dimming display device according to claim 10, wherein the gray level feature comprises an average pixel gray level of the image frame.

12. The global dimming display device according to claim 1, wherein the control circuit checks an average pixel gray level and a gray level histogram of the image frame, the control circuit converts the average pixel gray level into a preliminary gain parameter based on a gray level to gain conversion curve, the control circuit determines a gain upper limit based on the gray level histogram, the control circuit generates a pixel data gain parameter based on the gain upper limit and the preliminary gain parameter, and the control circuit gains the image frame based on the pixel data gain parameter to enhance the pixel gray level of the image frame.

13. The global dimming display device according to claim 12, wherein the control circuit compares the gain upper limit to the preliminary gain parameter, in response to the preliminary gain parameter being greater than the gain upper limit, the control circuit treats the gain upper limit as the pixel data gain parameter, and in response to the preliminary gain parameter not being greater than the gain upper limit, the control circuit treats the preliminary gain parameter as the pixel data gain parameter.

14. The global dimming display device according to claim 1, wherein the control circuit checks a gray level feature of the image frame, the control circuit converts the gray level feature into a dimming parameter based on a gray level to backlight conversion curve, and the control circuit performs global dimming on the backlight panel module based on the dimming parameter.

15. The global dimming display device according to claim 14, wherein the gray level feature comprises an average pixel gray level of the image frame.

16. The global dimming display device according to claim 1, wherein the control circuit checks an average pixel gray level and a gray level histogram of the image frame, the control circuit converts the average pixel gray level into a preliminary parameter based on a gray level to backlight conversion curve, the control circuit determines a protection upper limit based on the gray level histogram, the control circuit generates a dimming parameter based on the protection upper limit and the preliminary parameter, and the control circuit performs global dimming on the backlight panel module based on the dimming parameter.

17. The global dimming display device according to claim 16, wherein the control circuit compares the protection upper limit to the preliminary parameter, in response to the preliminary parameter being greater than the protection upper limit, the control circuit treats the protection upper limit as the dimming parameter, and in response to the preliminary parameter not being greater than the protection upper limit, the control circuit treats the preliminary parameter as the dimming parameter.

18. A control circuit configured to control a display panel module comprising a display panel and a backlight panel module comprising a backlight panel, the control circuit comprising:

a controller circuit coupled to the display panel module and the backlight panel module; and an image buffer circuit coupled to the controller circuit, wherein the image buffer circuit is configured to provide an image frame to the controller circuit, the controller circuit checks the image frame, in response to the image frame not being a dark picture, the controller circuit performs global dimming on the backlight panel module to set backlight brightness of the backlight panel module to normal backlight brightness, and in response to the image frame being a dark picture, the controller circuit performs global dimming on the backlight panel module to dim the backlight brightness from the normal backlight brightness to dark picture backlight brightness that is darker than the normal backlight brightness, and the controller circuit gains the entire image frame of the display panel module to enhance a pixel gray level of the image frame.

19. The control circuit according to claim 18, wherein in response to the image frame not being a dark picture, the controller circuit sets a pixel data gain parameter to a normal gain value, in response to the image frame being a dark picture, the controller circuit increases the pixel data gain parameter from the normal gain value to a dark picture gain value to enhance the pixel gray level of the image frame, the controller circuit gains the image frame based on the pixel data gain parameter to generate a gained image frame, and the control circuit controls the display panel module to display an image based on the gained image frame.

20. The control circuit according to claim 18, wherein in response to the image frame not being a dark picture, the controller circuit controls a dimming circuit of the backlight panel module to set the backlight brightness of the backlight panel module to the normal backlight brightness, in response to the image frame being a dark picture, the controller circuit controls the dimming circuit to dim the backlight brightness of the backlight panel module from the normal backlight brightness to the dark picture backlight brightness and gains the image frame to generate a gained image frame for the display panel module.

21. The control circuit according to claim 20, wherein the controller circuit comprises:

an image analysis circuit configured to analyze the image frame to calculate a gray level feature of the image frame;

a gain determination circuit coupled to the image analysis circuit, wherein in response to the gray level feature indicating that the image frame is not a dark picture, the gain determination circuit sets a pixel data gain parameter to a normal gain value, and in response to the gray level feature indicating that the image frame is a dark picture, the gain determination circuit increases the pixel data gain parameter from the normal gain value to a dark picture gain value to enhance the pixel gray level of the image frame;

a gain circuit coupled to the display panel module, wherein the gain circuit gains the image frame based on the pixel data gain parameter to generate the gained image frame for the display panel module; and a backlight determination circuit coupled to the image analysis circuit, wherein in response to the gray level feature indicating that the image frame is not a dark picture, the backlight determination circuit sets a dimming parameter to a normal brightness value, and in response to the gray level feature indicating that the image frame is a dark picture, the backlight determination circuit reduces the dimming parameter from the normal brightness value to a dark picture brightness value to reduce black pixel light leakage of the display panel module, wherein the dimming circuit performs global dimming on the backlight panel module based on the dimming parameter.

22. The control circuit according to claim 21, wherein the gray level feature comprises at least one of an average pixel gray level and a gray level histogram of the image frame.

23. The control circuit according to claim 21, wherein the controller circuit further comprises:

a hardware gain parameter register coupled between the gain determination circuit and the gain circuit, wherein the gain determination circuit writes the pixel data gain parameter into the hardware gain parameter register, and the gain circuit obtains the pixel data gain parameter from the hardware gain parameter register; and a hardware dimming parameter register coupled between the backlight determination circuit and the dimming circuit, wherein the backlight determination circuit writes the dimming parameter into the hardware dimming parameter register, and the dimming circuit obtains the dimming parameter from the hardware dimming parameter register.

24. The control circuit according to claim 18, wherein the controller circuit checks a gray level feature of the image frame, the controller circuit converts the gray level feature into a pixel data gain parameter based on a gray level to gain conversion curve, and the controller circuit gains the image frame based on the pixel data gain parameter to enhance the pixel gray level of the image frame.

25. The control circuit according to claim 24, wherein the gray level feature comprises an average pixel gray level of the image frame.

26. The control circuit according to claim 18, wherein the controller circuit checks an average pixel gray level and a gray level histogram of the image frame, the controller circuit converts the average pixel gray level into a preliminary gain parameter based on a gray level to gain conversion curve, the controller circuit determines a gain upper limit based on the gray level histogram, the controller circuit generates a pixel data gain parameter based on the gain upper limit and the preliminary gain parameter, and the controller circuit gains the image frame based on the pixel data gain parameter to enhance the pixel gray level of the image frame.

27. The control circuit according to claim 26, wherein the controller circuit compares the gain upper limit to the preliminary gain parameter, in response to the preliminary gain parameter being greater than the gain upper limit, the controller circuit treats the gain upper limit as the pixel data gain parameter, and in response to the preliminary gain parameter not being greater than the gain upper limit, the controller circuit treats the preliminary gain parameter as the pixel data gain parameter.

28. The control circuit according to claim 18, wherein the controller circuit checks a gray level feature of the image frame, the controller circuit converts the gray level feature into a dimming parameter based on a gray level to backlight conversion curve, and the controller circuit performs global dimming on the backlight panel module based on the dimming parameter.

29. The control circuit according to claim 28, wherein the gray level feature comprises an average pixel gray level of the image frame.

30. The control circuit according to claim 18, wherein the controller circuit checks an average pixel gray level and a gray level histogram of the image frame, the controller circuit converts the average pixel gray level into a preliminary parameter based on a gray level to backlight conversion curve, the controller circuit determines a protection upper limit based on the gray level histogram, the controller circuit generates a dimming parameter based on the protection upper limit and the preliminary parameter, and the controller circuit performs global dimming on the backlight panel module based on the dimming parameter.

31. The control circuit according to claim 30, wherein the controller circuit compares the protection upper limit to the preliminary parameter, in response to the preliminary parameter being greater than the protection upper limit, the controller circuit treats the protection upper limit as the dimming parameter, and in response to the preliminary parameter not being greater than the protection upper limit, the controller circuit treats the preliminary parameter as the dimming parameter.

32. An operation method of a control circuit configured to control a display panel module comprising a display panel and a backlight panel module comprising a backlight panel, the operation method comprising:

checking an image frame;

in response to the image frame not being a dark picture, performing global dimming on the backlight panel module to set backlight brightness of the backlight panel module to normal backlight brightness; and in response to the image frame being a dark picture, performing global dimming on the backlight panel module to dim the backlight brightness from the normal backlight brightness to dark picture backlight brightness that is darker than the normal backlight brightness, and gaining the entire image frame of the display panel module to enhance a pixel gray level of the image frame.

33. The operation method according to claim 32, further comprising:

in response to the image frame not being a dark picture, setting a pixel data gain parameter to a normal gain value;

in response to the image frame being a dark picture, increasing the pixel data gain parameter from the normal gain value to a dark picture gain value to enhance the pixel gray level of the image frame;

gaining the image frame based on the pixel data gain parameter to generate a gained image frame; and controlling the display panel module to display an image based on the gained image frame.

34. The operation method according to claim 32, further comprising:

in response to the image frame not being a dark picture, controlling a dimming circuit of the backlight panel module to set the backlight brightness of the backlight panel module to the normal backlight brightness; and in response to the image frame being a dark picture, controlling the dimming circuit to dim the backlight brightness of the backlight panel module from the normal backlight brightness to the dark picture backlight brightness and gaining the image frame to generate a gained image frame for the display panel module.

35. The operation method according to claim 32, further comprising:

checking a gray level feature of the image frame;

converting the gray level feature into a pixel data gain parameter based on a gray level to gain conversion curve; and gaining the image frame based on the pixel data gain parameter to enhance the pixel gray level of the image frame.

36. The operation method according to claim 35, wherein the gray level feature comprises an average pixel gray level of the image frame.

37. The operation method according to claim 32, further comprising:

checking an average pixel gray level and a gray level histogram of the image frame;

converting the average pixel gray level into a preliminary gain parameter based on a gray level to gain conversion curve;

determining a gain upper limit based on the gray level histogram;

generating a pixel data gain parameter based on the gain upper limit and the preliminary gain parameter; and gaining the image frame based on the pixel data gain parameter to enhance the pixel gray level of the image frame.

38. The operation method according to claim 37, wherein the operation of generating the pixel data gain parameter comprises:

comparing the gain upper limit to the preliminary gain parameter;

in response to the preliminary gain parameter being greater than the gain upper limit, treating the gain upper limit as the pixel data gain parameter; and in response to the preliminary gain parameter not being greater than the gain upper limit, treating the preliminary gain parameter as the pixel data gain parameter.

39. The operation method according to claim 32, further comprising:

checking a gray level feature of the image frame;

converting the gray level feature into a dimming parameter based on a gray level to backlight conversion curve; and performing global dimming on the backlight panel module based on the dimming parameter.

40. The operation method according to claim 39, wherein the gray level feature comprises an average pixel gray level of the image frame.

41. The operation method according to claim 32, further comprising:

checking an average pixel gray level and a gray level histogram of the image frame;

converting the average pixel gray level into a preliminary parameter based on a gray level to backlight conversion curve;

determining a protection upper limit based on the gray level histogram;

generating a dimming parameter based on the protection upper limit and the preliminary parameter; and performing global dimming on the backlight panel module based on the dimming parameter.

42. The operation method according to claim 41, wherein the operation of generating the dimming parameter comprises:

comparing the protection upper limit to the preliminary parameter;

in response to the preliminary parameter being greater than the protection upper limit, treating the protection upper limit as the dimming parameter; and in response to the preliminary parameter not being greater than the protection upper limit, treating the preliminary parameter as the dimming parameter.

* * * * *